Jan. 30, 1951 N. E. COUSINEAU 2,539,570
FOLDING COUNTING SCALE
Filed March 13, 1946 2 Sheets-Sheet 1
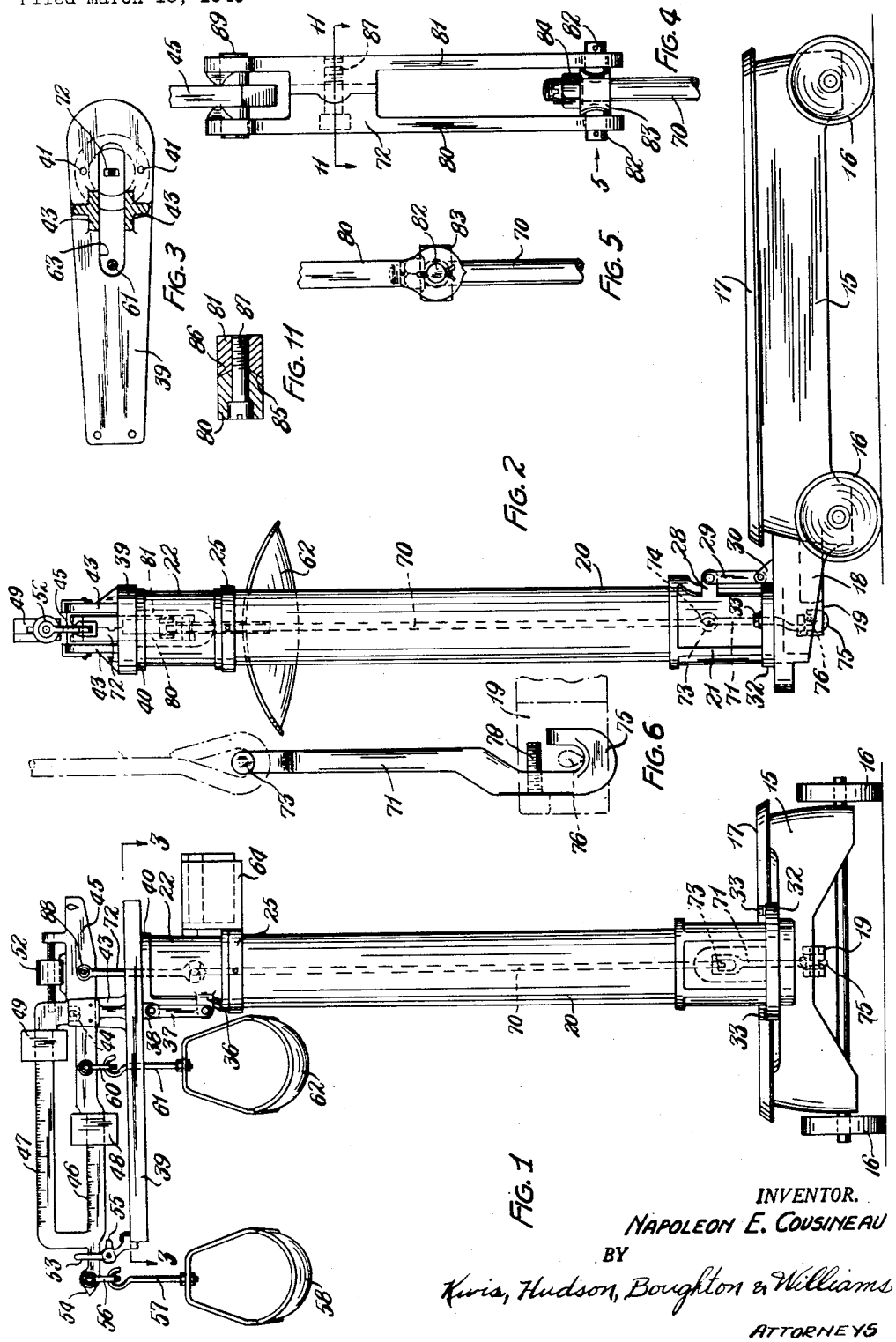
INVENTOR.
NAPOLEON E. COUSINEAU
BY
Kwis, Hudson, Boughton & Williams
ATTORNEYS

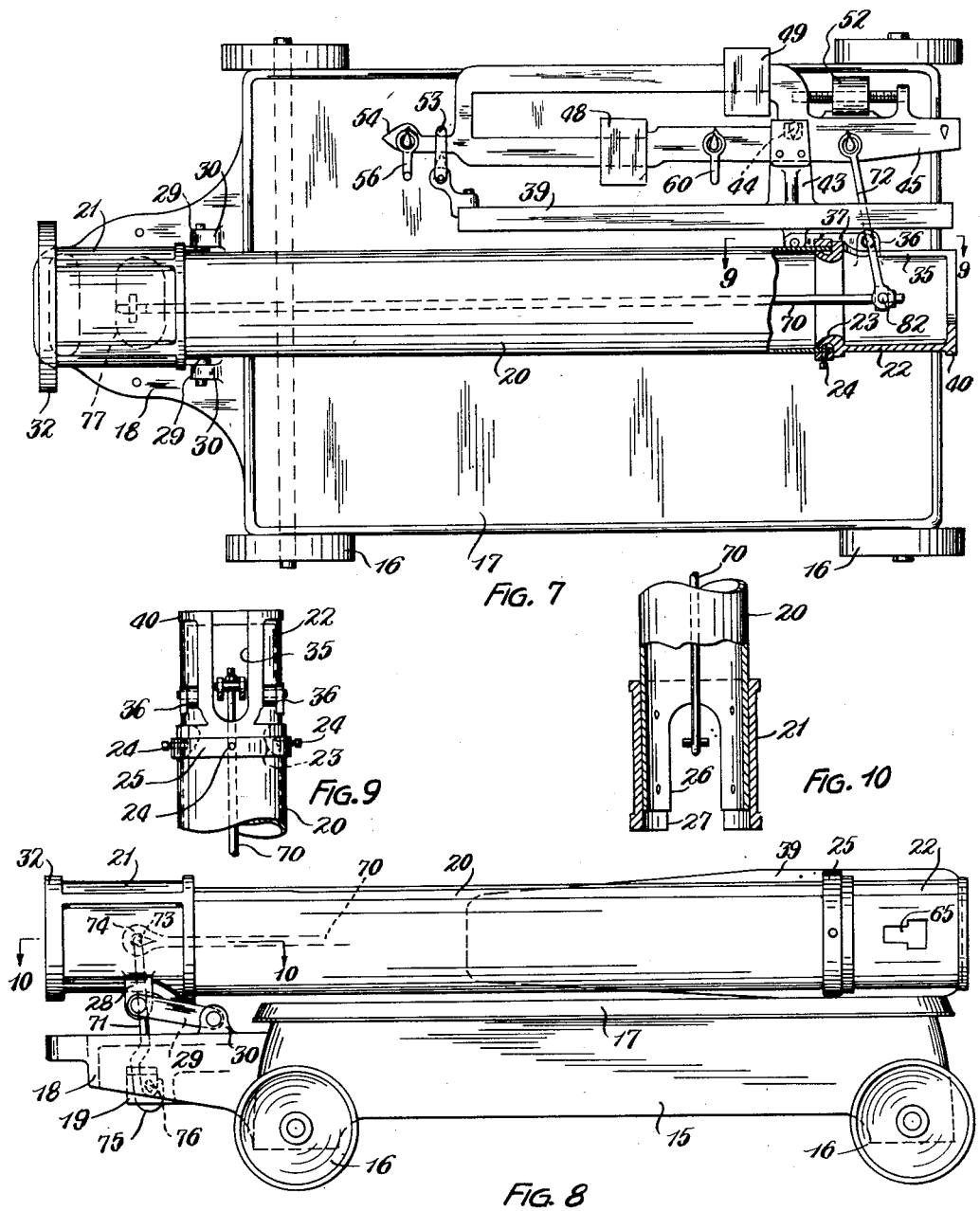

Patented Jan. 30, 1951

2,539,570

UNITED STATES PATENT OFFICE 2,539,570

FOLDING COUNTING SCALE

Napoleon E. Cousineau, Cleveland, Ohio

Application March 13, 1946, Serial No. 654,097

8 Claims. (Cl. 265—30)

1

This invention relates to improvements in counting scales, that is scales in which the platform or other main load carrier and a pan carrier are adapted to effect balance of the scale when a certain predetermined ratio between the number of identical articles on the platform and in the pan is reached or maintained.

Machines of this type are frequently used for taking inventories of small parts, and in such cases a number of machines may be rented from a service concern. When they are shipped from one location to another they must usually be taken apart, properly boxed and crated, and then upon arrival at their destination they must be reassembled. The latter operation generally requires the services of an expert. In accordance with the present invention the scale is so constructed that it may be folded into compact compass without the weighing mechanism being disconnected or disturbed, and may be unpacked and returned to operative condition by anyone who has the ability to use simple hand tools.

An object of the invention therefore is the provision of a counting scale in which the base, the column, and the column cap which carries the beam may be collapsed for shipment as distinguished from being disassembled.

Another object is the provision of a steelyard rod so constructed that when the column and column cap are collapsed and folded down onto the base or weighing platform, the steelyard rod need not be disconnected from the base lever or the scale beam.

A further object is the provision of a mounting for the cap and a joint of the steelyard rod which will permit the cap and beam to take an operative position either parallel to the longer dimension of the platform or at right angles thereto.

Other objects and features of novelty will appear as I proceed with the description of that embodiment of the invention which, for the purposes of the present application, I have illustrated in the accompanying drawings, in which Fig. 1 is an end elevational view of a counting scale of the platform type embodying the invention.

Fig. 2 is a side view of the same.

Fig. 3 is a plan view of the column cap, certain parts being shown in section on the line 3—3 of Fig. 1.

Fig. 4 is a detail elevational view on a larger scale of the main and upper sections of a multi-section steelyard rod which may be employed in connection with the invention.

Fig. 5 is a fragmental elevational view looking in the direction of arrow 5 of Fig. 4.

2

Fig. 6 is an elevational view of the lower section of the multi-section steelyard rod.

Fig. 7 is a plan view of the scale in its collapsed condition.

Fig. 8 is a side view of the same.

Fig. 9 is a fragmental detail view of the upper end of the column, the view being taken approximately on the line 9—9 of Fig. 7.

Fig. 10 is a detail sectional view of the lower end of the column taken substantially on the line 10—10 of Fig. 8, and Fig. 11 is a detail sectional view taken substantially on the line 11—11 of Fig. 4.

In the drawings 15 represents the base of a portable platform scale having supporting wheels 16 which permit the scale to be moved to any convenient location. The usual platform is shown at 17. From one end of the base there projects an extension 18 which covers a projecting part of a weighing lever 19 of conventional form. Extension 18 supports a hollow column the major portion of which is formed of a length of heavy tubing 20. This column comprises a lower end casting 21 which is adapted to rest upon the upper surface of base extension 18. The column also has a head 22, which however is not permanently fixed to the tubing section 20 and may be rotated thereupon. To this end it rests upon the upper edge of the tubing portion of the column and is provided with a flange 23 having a conical outer surface. This flange extends into the tubing portion of the column with a snug but rotatable fit. A series of setscrews 24 threaded through the tubing portion 20 and through a reenforcing ring 25 thereon engage the conical surface of the flange and serve to hold the head in adjusted position. After the screws 24 have been loosened the head may be turned to any desired angular position.

The lower end of tubing portion 20 of the column and the casting 21 attached thereto have registering slots 26 and 27. The casting 21 is provided with a pair of ears 28 disposed on opposite sides of the slot 27, and to each of these ears there is pivoted a link 29, the other extremities of these links being pivotally connected with ears 30 on the extension 18 of the base. The column may be swung on these pivoted links from the position of Fig. 2 to that of Fig. 8 or vice versa. When the column is in the position of Fig. 2 suitable means should be employed for locking it in that position. In the present instance a bottom flange 32 on the casting is perforated to receive machine screws 33 which are threaded into tapped holes in the base extension 18. The ears 28 and 30 and the links 29 are so dimensioned and disposed that when the column is collapsed, as illustrated in Fig. 8, the flange 32 assumes a position substantially flush with the outer end of extension 18. In the operative position of Fig. 2 also the column stands substantially flush with the outer end of this extension.

Head 22 has an upwardly opening slot 35 similar to the slot 26, 27. On opposite sides of this slot 35 there are ears 36 to which are pivoted links 37, the latter being pivoted to a pair of ears 38 which are formed integral with an elongated column cap 39 which rests upon a flange 40 at the top of head 22. The cap may be locked to the flange 40 by screws, not shown, which extend through bores 41 in the cap and are threaded into tapped holes in the head 22.

Extending upwardly from the surface of cap 39 there are two spaced fulcrum stands 43 which carry agate bearings forming fulcra for a pair of knife edges 44 carried in a beam 45, which may have a pair of weighing scales 46 and 47 with co-operating slide weights 48 and 49. A balance ball 52 of any desired or conventional form may be mounted on the beam. At one end of cap 39 there is a beam stop 53 through which projects a constricted part 54 of the beam. A trigger 55 is provided for locking the beam against movement when desired.

A loop 56 hangs from the extremity of the beam and receives a hook 57 that carries a high ratio pan 58. A second loop 60 hangs from the beam rather close to the fulcrum 54 and supports a hook 61 which carries a low ratio pan 62. Hook 61 extends through an elongated slot 63 in the cap 39 between the fulcrum stands 43. 64 is a weight box which is removably mounted on the head 22 by means of a bracket which extends into a T-slot 65 in the head.

Lever 19 is connected with beam 45 by means of a steelyard rod which is formed in three sections, that is a main section 70, a lower section 71 and an upper section 72. The lower section 71 is connected with the main section 70 by a pivotal joint, which may comprise a yoke 73 on the section 71 surrounded by an eye 74 on the main section 70, the yoke being disposed at right angles to the planes of links 29. At the lower extremity of section 71 there is a hook 75 which extends beneath a knife edge 76 carried by the lever 19. Section 71 extends upwardly through a slot 77 (Fig. 7) in the extension 18 of the base, and when the scale is in the collapsed condition this section 71 extends also through the slot 26, 27 at the bottom of the column. In order that there may be no accidental disconnection of the hook 75 from the knife edge 76, I may mount a screw 78 in the section just above the hook, as shown particularly in Fig. 6.

The upper section 72 of the steelyard rod is formed of two elements 80 and 81 having eyes at their lower extremities which receive trunnions 82 that project from a ring or collar 83 that is loosely rotatable upon the main section 70 of the rod. A castellated nut 84 at the top of section 70 serves to regulate the length of the steelyard rod and also to take any pull exerted by a load upon the platform 17. The two elements 80 and 81 are held securely together by double bevel surfaces 85 and 86 together with a screw 87. The upper ends of the elements 80 and 81 are formed with eyes 88 which receive a knife edge fulcrum 89 that is mounted in and extends laterally both ways from beam 45. This upper section 72 of the steelyard rod extends through the slot 63 in the cap. When the scale is collapsed section 72 projects through slot 35, as illustrated in Fig. 7.

When the scale is to be collapsed for shipment, the operator removes the pans 58 and 62 and swings trigger 55 up into position to prevent movement of the beam 45 upon its fulcrum. He then removes screws 33 and the screws which project through holes 41 in the cap 39. Next he swings the cap 39 and beam 45 down upon the links 37 until the cap and beam come into parallelism with the column, the links 37 then extending downwardly from the ears 36, and the right hand end of the cap and beam coming substantially flush with column head 22. The column together with the cap and beam may then be swung down on the links 29 into the position of Figs. 7 and 8, which will cause the lower end of the column to come substantially flush with the end of base extension 18. The collapsed scale is thus brought into a very compact compass, and this is accomplished without disturbing the connections between the three steelyard sections and without disconnecting the steelyard rod from the lever 19 or the beam 45. In setting up the scale again after shipment the reverse operations are followed. No tools other than a wrench and a screwdriver are required.

The swivel connection between the steelyard main section 70 and upper section 72 permits turning the cap 39 with the beam 45 into any angular position without in any way affecting the action of the steelyard rod. Frequently it is desirable to have the beam disposed parallel to the long dimension of the platform 17, either above that platform or at an 180° angle from that position. This is especially true where the scale is wheeled to various positions in a narrow aisle. Merely loosening the screws 24 permits swinging the head 22 with the cap and beam carried thereby through any desired angle. Then tightening the screws 24 will hold the parts at that angle. The operation of counting scales being well understood in the art, no description of the operation of the scale from that standpoint is necessary.

Having thus described my invention, I claim:

1. In a weighing scale, a base, a column, a column cap, a beam carried by said cap, an articulated connection between said column and said cap permitting the cap and beam to be turned around the axis of the column and to be swung into parallelism with said column, and an articulated connection between said column and said base permitting the column, cap and beam to be swung down into juxtaposition with said base.

2. In a weighing scale, a base, a column, a column cap, a beam carried by said cap, said cap and beam overhanging the column in both directions, and an articulated connection embodying a link pivoted to the column and to the cap permitting the cap and beam to be swung into parallelism with the column substantially flush with the upper end thereof.

3. In a weighing scale, a base, a column of substantially the same length as said base, a column cap, a beam carried by said cap, an articulated connection embodying a link pivoted to the column and to the cap permitting the cap and beam to be swung into parallelism with said column substantially flush with the upper end of the column, and an articulated connection embodying a link pivoted to the base and to the column permitting the column, cap and beam to be swung down into juxtaposition with said base and substantially flush with both ends of the latter.

4. In a weighing scale, a hollow column, a cap therefor, a beam carried by said cap, a jointed steelyard rod in said column comprising a main section and an upper section pivotally connected together, said upper section being pivotally connected with said beam, and an articulated connection between said column and cap permitting the cap and beam to be swung into parallelism with said column without disconnecting said steelyard rod, said upper section being of a length substantially equal to the spacing of said beam from the axis of the column when the said parts are in collapsed condition.

5. In a weighing scale, a base, a base lever, a hollow column, a column cap, a beam carried by said cap, a three part jointed steelyard rod in said column connecting said lever and beam, and articulated connections between said column and cap and between said column and base permitting said cap and beam to be swung into parallelism with said column, and permitting said column, cap and beam to be swung into juxtaposition with said base, without disconnecting said steelyard rod.

6. In a weighing scale, a hollow column, a cap therefor, a beam carried by said cap, a jointed steelyard rod in said column comprising a main section and an upper section pivotally connected together, said upper section being pivotally connected with said beam, and an articulated connection between said column and cap permitting the cap and beam to be swung into parallelism with said column, the upper end of said column having a longitudinal slot therethrough offset from said articulated connection, through which the upper section of said steelyard rod may extend when the cap and beam are swung into parallelism with said column.

7. In a weighing scale, a hollow column, a hollow head on said column rotatable about the axis thereof, a cap carried by said head, a beam carried by said cap, an articulated connection between said head and said cap permitting the cap and beam to be swung into parallelism with said column, a jointed steelyard rod in said column having a main section and an upper section swiveled and hinged to said main section, said upper section being pivoted to said beam, whereby the steelyard rod is maintained in operative position in different angular positions of said head and beam, and whereby said cap and beam may be swung into parallelism with said column without disconnecting said steelyard rod.

8. A weighing scale as defined in claim 7, wherein the joint between the main section of said steelyard rod and the upper section thereof comprises a pair of opposed trunnions mounted to swivel about one of said sections, said trunnions constituting also a pivotal connection between the two rod sections.

NAPOLEON E. COUSINEAU.

REFERENCES CITED

The following references are of record in the file of this patent:

UNITED STATES PATENTS

| Number | Name | Date |
|---|---|---|
| 316,178 | Reynolds | Apr. 21, 1885 |
| 659,292 | Culmer | Oct. 9, 1900 |
| 1,436,360 | Rowe et al. | Nov. 21, 1922 |
| 1,626,963 | Osgood et al. | May 3, 1927 |
| 1,764,275 | Mittendorf | June 17, 1930 |
| 1,887,986 | Baldwin | Nov. 15, 1932 |
| 1,992,262 | Upp | Feb. 26, 1935 |
| 2,432,006 | Haferl | Dec. 2, 1947 |

FOREIGN PATENTS

| Number | Country | Date |
|---|---|---|
| 727,241 | France | June 15, 1932 |